United States Patent Office 2,885,326
Patented May 5, 1959

2,885,326

PRODUCTION OF CYCLOHEXIMIDE

Bruce W. Churchill, Comstock Township, Kalamazoo County, Mich., assignor to The Upjohn Company, Kalamazoo, Mich., a corporation of Michigan No Drawing. Application January 26, 1956
Serial No. 561,673

4 Claims. (Cl. 195—80)

This invention relates to a process and is particularly directed to improvements in the production of cycloheximide.

Cycloheximide is an antibiotic produced by *Streptomyces griseus*, the organism also known to produce streptomycin. Suitable methods for the preparation and recovery of cycloheximide are set forth in U.S. Patents 2,574,519 and 2,612,502.

Since the culturing of *Streptomyces griseus* produces both cycloheximide and streptomycin, the production and recovery of one or the other of these two antibiotics is complicated by the presence of the other. It is the principal object of this invention, therefore, to provide a process for culturing *Streptomyces griseus* which augments the production of cycloheximide relative to streptomycin, thereby to improve the production of cycloheximide and to expedite its recovery from the fermented medium.

The above primary object and others, as will become apparent as the description proceeds, are accomplished in the present invention by growing the *Streptomyces griseus* in a medium containing soybean meal, glucose, and potassium dihydrogen phosphate in the proportions of between 0.15 and 0.25 gram per liter of potassium dihydrogen phosphate, at least fourteen grams per liter of soybean meal and about four parts of glucose for each part of soybean meal. Parts herein refer to parts by weight unless otherwise specified.

In the presence of a high level of soybean meal, at least fourteen grams per liter and a high ratio of glucose to soybean meal, i. e., about four to one, it was found that the optimum level of potassium dihydrogen phosphate for the production of cycloheximide is about twenty to sixty (advantageously forty) parts per million of added phosphorus and that concentrations above sixty parts per million and below twenty parts per million markedly reduce the yield. It was further found that under like conditions, the optimum concentration of phosphorus for the production of streptomycin was about twice (eighty parts per million) that found for cycloheximide. Thus by maintaining a high level of soybean meal, at least fourteen grams per liter, and a high ratio of glucose to soybean meal, that is, in the order of four parts of glucose to one part of soybean meal, and keeping the amount of phosphorus within the above-stated critical limits, that is, between about 0.15 and about 0.25 gram per liter (twenty to sixty parts per million of added phosphorus), production of cycloheximide is significantly favored and recovery of cycloheximide facilitated.

The effect of varying the proportions within and without the limits of the invention are shown in the following tables. The data set forth in these tables was obtained in the following manner:

An agar slant of a culture of cycloheximide-producing *Streptomyces griseus* was used to inoculate a 500-milliliter Erlenmeyer flask with indented baffles for increased agitation containing 100 milliliters of the medium being tested. The inoculation was made with a one-milliliter spore suspension prepared by adding ten milliliters of sterile distilled water to the agar slant and loosening the spores with a sterile wire loop. This flask was incubated at 24 degrees centigrade at 300 revolutions per minute on a rotary shaker for five days and assayed by paper disc assay method using the test organism, *Saccharomyces pastorianus*. A pure standard of actidione is assayed on each plate. The basal medium in each case contained eight grams per liter of calcium carbonate, five grams per liter of ammonium sulfate, 2.5 grams per liter of brewer's yeast, and 4.0 grams per liter of sodium chloride plus the ingredients listed in the tables.

TABLE I

*The effect of sub-optimal concentrations of soybean meal*

| Medium No. | Soybean, g./l. | Glucose, g./l. | $KH_2PO_4$, g./l. | Peak Cycloheximide, mcg./ml. |
|---|---|---|---|---|
| 1 | 7 | 25 | 0.4 | 360 |
| 2 | 7 | 35 | 0.2 | 415 |
| 3 | 7 | 45 | 0.4 | 280 |
| Control A | 14 | 60 | 0.4 | 860 |
| Control B | 14 | 60 | 0.2 | 1,100 |

Control A is non-optimum with reference to potassium dihydrogen phosphate and is included for comparison with media 1 and 3. Control B is an optimum formulation according to the invention which may be compared with medium 2.

These data clearly show the adverse effect of sub-optimum concentrations of soybean meal and that this adverse effect is not eliminated by increasing the glucose or varying the potassium dihydrogen phosphate.

TABLE II

*Effect of sub-optimal ratio of glucose to soybean meal*

| Medium No. | Soybean, g./l. | Glucose, g./l. | $KH_2PO_4$, g./l. | Peak Cycloheximide, mcg./ml. |
|---|---|---|---|---|
| 4 | 14 | 25 | 0.4 | 300 |
| 5 | 14 | 45 | 0.4 | 680 |
| 6 | 14 | 50 | 0.4 | 770 |
| 12 | 21 | 25 | 0.4 | 260 |
| 13 | 21 | 50 | 0.4 | 665 |
| 14 | 21 | 60 | 0.2 | 800 |
| 15 | 21 | 70 | 0.2 | 850 |
| Control A | 14 | 60 | 0.4 | 860 |
| Control B | 14 | 60 | 0.2 | 1,100 |
| Control C | 21 | 90 | 0.2 | 1,040 |

The data of Table II show that insufficient glucose materially impairs the yield of cycloheximide and that the important thing is not the quantity of glucose but the ratio of glucose to soybean meal.

TABLE III

*Effect of non-optimal concentration of potassium dihydrogen phosphate*

| Medium No. | Soybean, g./l. | Glucose, g./l. | $KH_2PO_4$, g./l. | Peak Cycloheximide, mcg./ml. |
|---|---|---|---|---|
| 29 | 14 | 60 | 0.0 | 365 |
| 28 | 14 | 60 | 0.15 | 1,040 |
| 9 (Control B) | 14 | 60 | 0.2 | 1,100 |
| 27 | 14 | 60 | 0.25 | 1,110 |
| 8 (Control A) | 14 | 60 | 0.4 | 860 |
| 21 | 14 | 60 | 1.4 | 225 |

These data show that the yields of around 1000 or more micrograms per milliliter are obtained only when the potassium dihydrogen phosphate concentration falls between about 0.15 and about 0.25 gram per liter.

TABLE IV

*Effect of optimal proportions*

| Medium No. | Soybean, g./l. | Glucose, g./l. | KH₂PO₄, g./l. | Peak Cycloheximide, mcg./ml. |
|---|---|---|---|---|
| 7 | 14 | 55 | 0.2 | 1,000 |
| 9 (Control B) | 14 | 60 | 0.2 | 1,100 |
| 10 | 14 | 65 | 0.2 | 1,030 |
| 16 | 21 | 90 | 0.2 | 1,040 |
| 19 | 28 | 120 | 0.2 | 1,040 |
| 27 | 14 | 60 | 0.25 | 1,110 |
| 28 | 14 | 60 | 0.15 | 1,040 |

These data show that consistently high yields are obtained over a wide range of concentration of soybean meal when the glucose to soybean meal is about four to one and the concentration of potassium dihydrogen phosphate is between about 0.15 and about 0.25 gram per liter. The upper limit of soybean meal is determined by the viscosity of the medium and ordinarily will not be greater than about thirty grams per liter.

The same unusually high yield of cycloheximide in the shake flask, as reported above, was obtained in 100-gallon fermentors. The media tested were medium 1, medium 8 (Control A), and medium 9 (Control B) (see Table I). The results obtained are given in the following table:

TABLE V

*Cycloheximide yields in 100-gallon fermentors with three media at 4 and 5 days*

[Cycloheximide yields in mcg./ml. in 3 media with 3 series of runs.

| Medium No. 1 | | Medium No. 8 (Control A) | | Medium No. 9 (Control B) | |
|---|---|---|---|---|---|
| 4-day | 5-day | 4-day | 5-day | 4-day | 5-day |
| 425 | ---- | 680 | ---- | ---- | ---- |
| ---- | ---- | 840 | ---- | ---- | ---- |
| ---- | ---- | 740 | ---- | ---- | ---- |
| ---- | ---- | 880 | ---- | ---- | ---- |
| 510 | 370 | 720 | 900 | 720 | 1,020 |
| ---- | ---- | 555 | 800 | 700 | 1,100 |
| 400 | 410 | ---- | ---- | 940 | 1,110 |
| ---- | ---- | ---- | ---- | 930 | 1,160 |
| ---- | ---- | ---- | ---- | 940 | 1,080 |
| ---- | ---- | ---- | ---- | 605 | 1,020 |

These data show that the medium according to the invention (medium 9) gives the same yield in 100-gallon fermentors as in the shaken flask and that the average yield is some 200 percent greater than that obtained with medium 1 in parallel fermentations. These data also show that with the higher yielding media, the organism continues to produce cycloheximide over a longer period of time, a fact which can account in part for the unusually high yields obtained. These data also show that excessive concentration of potassium dihydrogen phosphate inhibits production of cycloheximide. The same high yields of cycloheximide with the media of the invention has also been obtained in 5000-gallon and larger fermentors.

The other components of the medium, while desirable for adjuvants, can be omitted without voiding the relative increase in yield resulting from the use of soybean meal, glucose, and potassium dihydrogen phosphate in the proportion stated. The calcium carbonate is advantageously used for pH adjustment and for this purpose can range from about five grams to about ten grams per liter. Larger amounts can be used but because of the insolubility of calcium carbonate are not desirable. The ammonium sulfate is advantageously used as an ionically available nitrogen source and for this purpose can range from about 2.5 to about 7.5 grams per liter. Larger amounts are undesirable because of the excessive amount of sulfuric acid liberated in the metabolism of the ammonia. The brewer's yeast is advantageously used on account of its content of vitamins and growth-promoting substances and for this purpose can range from about one to about five grams per liter. Larger amounts, however, can be used. The sodium chloride is advantageously used to maintain ionic balance and for this purpose can range from about two to about six grams per liter. Larger amounts are undesirable.

The optimum temperature for the process of the invention is about 24 degrees centigrade but can be varied between about 22 to about 26 degrees centigrade and in this respect differentiates from the optimum temperature of thirty degrees centigrade (28 to 32 degrees centigrade) for streptomycin production.

The cycloheximide can be recovered from the fermentation media prepared according to the invention by the known procedures such as are described in U.S. Patents 2,574,519 and 2,612,502. Because of the unusually high yields of cycloheximide obtained by the process of the invention, however, a simplified procedure can be utilized for recovering the cycloheximide.

According to this simplified procedure, the whole beer from the fermentor is adjusted to pH 3.5–5.5 with sixty percent sulfuric acid and heated to about 60 degrees centigrade for ten minutes, cooled to 30 degrees centigrade and clarified in a filter press with the aid of diatomaceous earth or like filter aid. The clarified beer is then extracted in a Podbielniak extractor with methylene chloride using 0.2 volume of methylene chloride per volume of beer. The methylene chloride solution thus obtained is clarified in a centrifugal separator and decolorized with decolorizing carbon. It is then concentrated twenty to forty-fold and decolorized a second time with decolorizing carbon. The thus-decolorized methylene chloride extract is concentrated further to a solid content of about 400–500 grams per liter and then diluted with three liters of amyl acetate per kilogram of total solids and distilled in vacuo to remove the methylene chloride. The temperature should be kept below about seventy degrees centigrade. The cycloheximide is then crystallized from the amyl acetate solution and the crystals washed with technical hexane and, if desired, recrystallized from amyl acetate. By this simplified procedure there is obtained cycloheximide meeting the following specifications: (a) melting point between 105 and 120 degrees centigrade, (b) weight loss on drying not to exceed 0.3 percent, and (c) potency of at least 800 micrograms per milligram by the *S. pastorianus* plate assay.

It is to be understood that the invention is not to be limited to the exact details of operation or exact compounds and materials shown and described, as obvious modifications and equivalents will be apparent to one skilled in the art, and the invention is therefore to be limited only by the scope of the appended claims.

I claim:

1. In a process for the production of cycloheximide by the culturing of a cycloheximide-producing strain of *Streptomyces griseus*, the improvement which comprises culturing the cycloheximide-producing *Streptomyces griseus* medium containing soybean meal, glucose, and potassium dihydrogen phosphate in the proportions of at least fourteen grams of soybean meal per liter, 0.15 to 0.25 grams of potassium dihydrogen phosphate per liter, and about four parts of glucose for each part of soybean meal, said culturing being effected at a temperature between 22 and 26 degrees centigrade whereby production of streptomycin is inhibited and production of cycloheximide is favored.

2. A process for producing cycloheximide which comprises culturing a cycloheximide-producing strain of *Streptomyces griseus* in a medium containing soybean meal, glucose, and potassium dihydrogen phosphate in the proportions of at least fourteen grams of soybean meal per liter, from about 0.15 to about 0.25 gram of potassium dihydrogen phosphate per liter, and about four parts of glucose per part of soybean meal, until the concentration of cycloheximide reaches at least about 1000 micrograms per milliliter and then recovering the cycloheximide therefrom, said culturing being effected at a temperature between 22 and 26 degrees centigrade whereby production of streptomycin is inhibited and production of cycloheximide is favored.

3. A process for producing cycloheximide which comprises culturing at a temperature between 22 and 26 degrees centigrade a cycloheximide-producing strain of *Streptomyces griseus* in a medium containing soybean meal, glucose, and potassium dihydrogen phosphate in the proportions of at least fourteen grams of soybean meal per liter, from about 0.15 to about 0.25 gram of potassium dihydrogen phosphate per liter, and about four parts of glucose per part of soybean meal, until the concentration of actidione reaches at least about 1000 micrograms per milliliter, then acidifying the culture medium to pH 3.5–5.5 and clarifying the same, extracting the clarified beer with methylene chloride, decolorizing the methylene chloride extract and concentrating it from twenty to forty-fold, decolorizing the concentrate, replacing the methylene chloride with amyl acetate, and crystallizing cycloheximide from the amyl acetate solution.

4. A process for recovering cycloheximide from high titer whole beer which contains at least 1000 micrograms of cycloheximide per milliliter which comprises acidifying the whole beer to pH 3.5–5.5 and clarifying the same, extracting the clarified beer with methylene chloride, decolorizing the methylene chloride extract and concentrating it from twenty to forty-fold, decolorizing the concentrate, replacing the methylene chloride with amyl acetate, and crystallizing cycloheximide from the amyl acetate solution.

References Cited in the file of this patent

UNITED STATES PATENTS

| | | |
|---|---|---|
| 2,516,682 | Donovick | July 25, 1950 |
| 2,541,726 | Trussell | Feb. 13, 1951 |
| 2,571,693 | Dulaney | Mar. 20, 1951 |
| 2,574,519 | Whiffin | Nov. 13, 1951 |
| 2,612,502 | Leach | Sept. 30, 1952 |
| 2,621,146 | Thornberry | Dec. 9, 1952 |

FOREIGN PATENTS

| | | |
|---|---|---|
| 639,943 | Great Britain | July 12, 1950 |

OTHER REFERENCES

Levine et al.: Culture Media for Cultivation of Microorganisms, Williams and Wilkins, Baltimore, page 884.
Waksman et al.: Jour. Bact., 51, 1946, pages 751–759.
Whiffin et al.: Jour. Bact., 52, 1946, pages 610–611.

UNITED STATES PATENT OFFICE
CERTIFICATE OF CORRECTION

Patent No. 2,885,326                                                            May 5, 1959

Bruce W. Churchill

It is hereby certified that error appears in the printed specification of the above numbered patent requiring correction and that the said Letters Patent should read as corrected below.

Column 4, line 59, after "griseus", in italics, insert -- in a --; column 5, line 16, for "actidione" read -- cycloheximide --.

Signed and sealed this 22nd day of September 1959.

(SEAL)
Attest:

KARL H. AXLINE                                              ROBERT C. WATSON
Attesting Officer                                          Commissioner of Patents